United States Patent [19]
Diebolt et al.

[11] 3,929,165
[45] Dec. 30, 1975

[54] TUBULAR HINGE ASSEMBLY

[75] Inventors: Edwin J. Diebolt, Muncie; Roger A. Hendrickson, Indianapolis, both of India

[73] Assignee: Ball Corporation, Muncie, Ind.

[22] Filed: Oct. 17, 1974

[21] Appl. No.: 515,459

Related U.S. Application Data

[63] Continuation of Ser. No. 207,069, Dec. 13, 1971, abandoned.

[52] U.S. Cl. .................. 138/121; 285/226
[51] Int. Cl.² .................. F16L 11/06
[58] Field of Search ........... 285/226, 229, 227, 228, 285/299, 300, 301, DIG. 4, 44; 92/34, 42, 47; 74/18, 18.1, 18.2; 239/33; 138/121, 119; 403/50, 51

[56] References Cited
UNITED STATES PATENTS

| | | | |
|---|---|---|---|
| 1,902,323 | 3/1933 | Monge | 92/47 X |
| 2,324,173 | 7/1943 | Porter | 92/42 |
| 2,616,255 | 11/1952 | Altorfer | 285/229 X |
| 2,920,656 | 1/1960 | Bertolet | 285/226 X |
| 3,409,224 | 11/1968 | Harp et al. | 285/226 X |

*Primary Examiner*—Thomas F. Callaghan
*Attorney, Agent, or Firm*—Gilbert E. Alberding

[57] ABSTRACT

A hinge assembly, especially suitable for use as an integral part of a conduit, such as, for example, a washing machine hose or the like, is disclosed herein and is provided for allowing portions of the conduit to move relative to each other between a plurality of alternate, stable or toggled positions so that the conduit can be easily contoured to fit around and/or in between various surrounding components.

6 Claims, 6 Drawing Figures

INVENTORS
Edwin J. Diebolt
Roger A. Hendrickson
BY Robert E Harris
Attorney

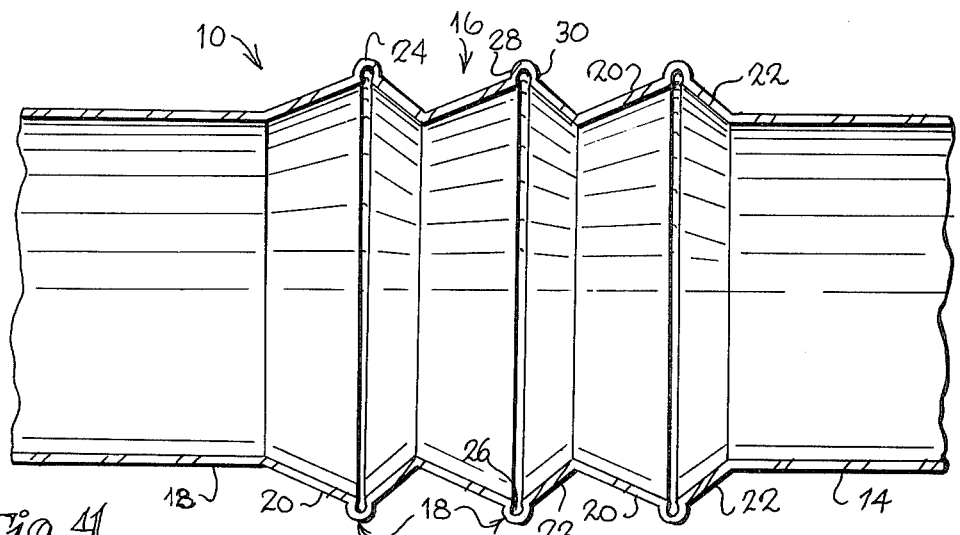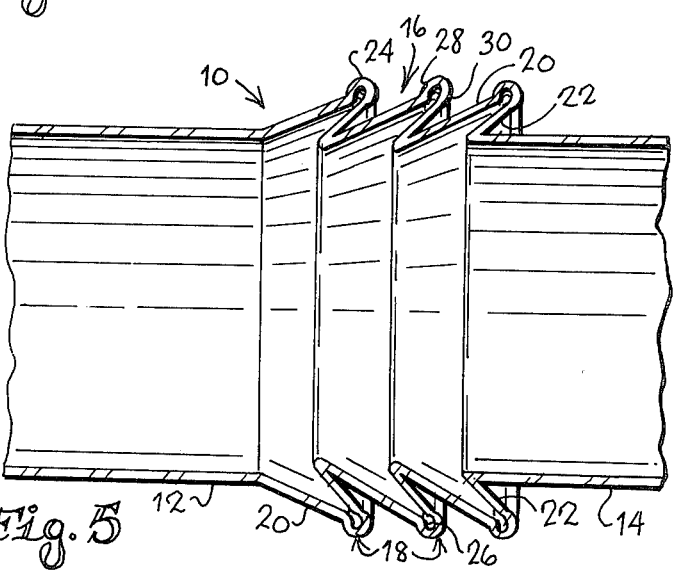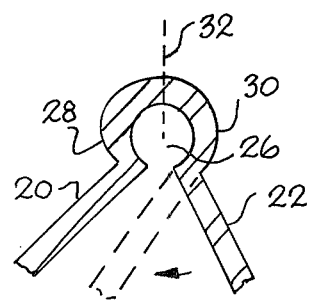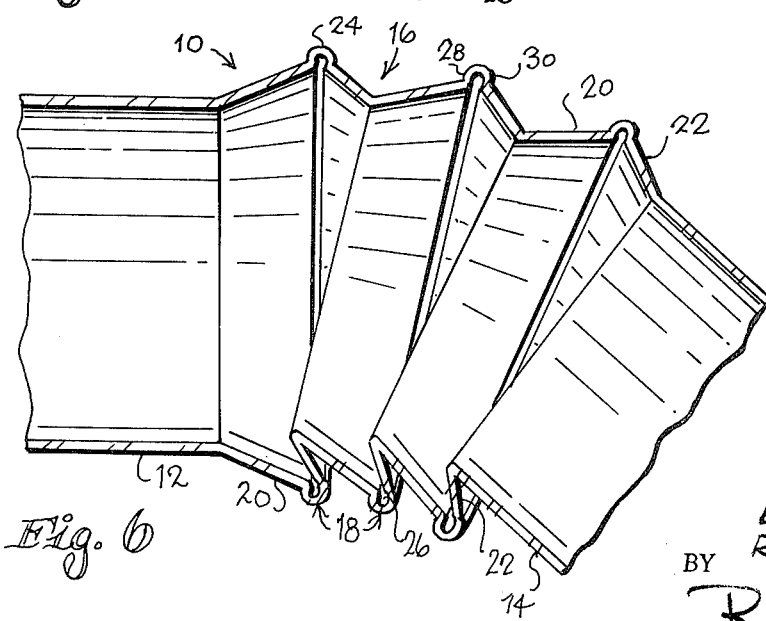

TUBULAR HINGE ASSEMBLY

This is a continuation of my earlier copending application, Ser. No. 207,069, filed Dec. 13, 1971 and now abandoned.

This invention relates generally to a hinging or toggle joint assembly and more particularly to an assembly especially suitable for incorporation as part of a conveyance or support conduit.

The importance of providing hinge or toggle joint assemblies for connecting and bending or otherwise moving two parts or components relative to each other is readily apparent. For example, hoses, tubes and other such conveyance and support conduits are used in many diverse applications which require the capability of bending or otherwise contouring the tubes to conform with their respective intended uses. As an illustration of this, a fluid hose, utilized in, for example, a standard automobile engine, must be bent or otherwise contoured to fit around and/or between adjacent stationary and/or moving parts, some of which are extremely hot, and yet sufficiently spaced from these parts so as not to obstruct operation thereof or be damaged thereby.

However, heretofore many of the known conveyance or support tubes which require contouring in their respective applications have been susceptible to malfunction, particularly over a period of usage, due, for example, to formation of cracks, especially at the bending points of the tubes. On the other hand, many of these tubes have either lacked the necessary degree of flexibility for enabling them to be properly contoured at all or have been too flexible, thereby lacking the necessary rigidity required in maintaining their contoured shape. While these problems can, for the most part, be rectified by providing a custom designed conduit or support tube pre-shaped for its intended use, this is, of course, expensive.

Turning to a particular example of the prior art, attention is directed to a flexible drinking tube, which is disclosed in U.S. Letters Pat. No. 3,409,224, issued to H. J. Harp et al on Nov. 5, 1968, and relates to a flexible tube and, more particularly, to a tube of sufficiently small diameter so as to be used as a drinking straw. The drinking straw or tube which is described in the Harp et al patent and which displays a cross-sectional diameter of approximately 0.005 to 0.008 inch is capable of bending between various stable or toggled positions and remaining in these positions until further bending or axial forces are applied thereto.

However, it has been found that an enlarged version of the tube constructed in accordance with the Harp et al patent is less flexible and loses its ability to toggle between various stable positions. For example, with a 1 inch outside cross-sectional diameter and a wall thickness of about 0.015 to 0.035 inch, the tube, constructed in accordance with the Harp et al disclosure, does not toggle at all. This, of course, is understandable, since the Harp et al reference is apparently concerned only with drinking tubes rather than tubes of a larger scale. Accordingly, while the Harp et al design is quite satisfactory for the use intended, that is, as a conventionally-sized drinking straw, it has been found to be inapplicable with regard to larger tubes.

The present invention provides a heretofore unavailable improvement in a toggle joint assembly which is constructed in accordance with the present invention and which comprises at least one toggle joint including two side portions having respective edges connected together in a spaced-apart relationship by a third, preferably integrally connected, hinge portion so that at least one of the side portions is movable about its connection with said hinge portion between at least two alternate stable positions.

Accordingly, an object of the present invention is to provide a new and improved hinge or toggle joint assembly which is especially suitable for incorporation with a conveyance or support tube for allowing the tube to be bent or otherwise moved between at least two alternate stable or toggled positions.

Another object of the present invention is to provide a new and improved toggle joint assembly including at least one portion which is movable between at least three alternate stable positions along at least two paths of travel that have an angular relationship to one another of less than a straight angle.

A further object of the present invention is to provide a conveyance or support tube such as, for example, a water hose which includes a toggle joint assembly, preferably integrally formed with the tube, for allowing said tube to be bent between a plurality of alternate stable or toggled positions and in a plurality of different paths.

These and other objects and features of the present invention will become apparent from the following detailed description, in conjunction with the accompanying drawings, in which:

FIG. 4 is a sectional view of the toggle joint assembly when the latter is in its axially extended position, the view being taken along line 4—4 in FIG. 1;

FIG. 5 is a sectional view of the toggle joint assembly when the latter is in its axially contracted position, the view being taken along line 5—5 in FIG. 2;

FIG. 6 is a sectional view of the toggle joint assembly when the latter is in its bent position, the view being taken along line 6—6 in FIG. 3; and FIG. 7 is a fragmentary cross-sectional view illustrating a hinge element comprising part of the present invention.

Figure 1:
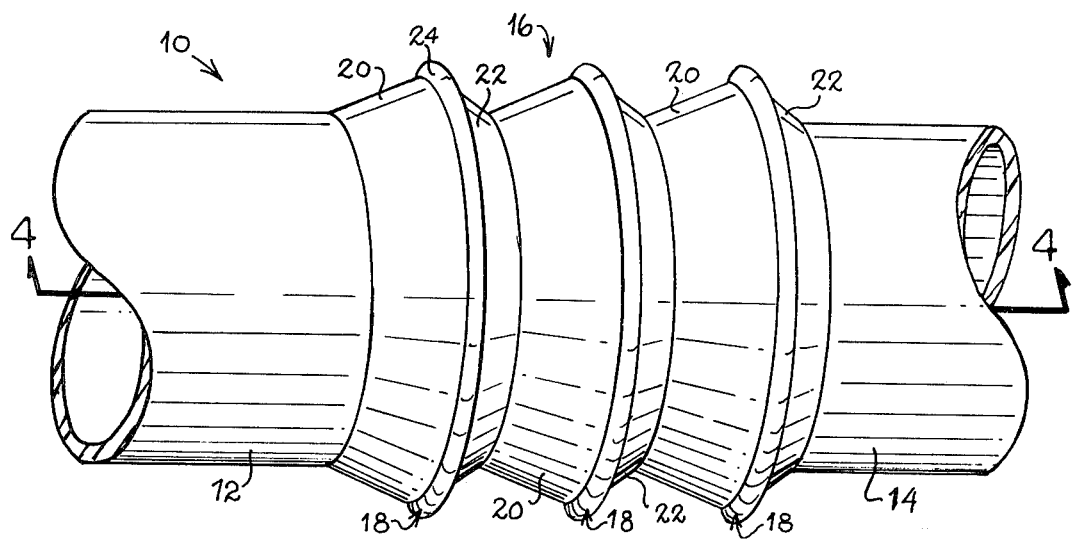
FIG. 1 is a perspective view of a portion of a tube including a toggle joint or hinge assembly constructed in accordance with the present invention and illustrated in an axially extended position.

Turning now to the drawings, wherein like elements are designated by like reference numerals throughout the various figures, a tube 10, constructed in accordance with the present invention, is illustrated in the drawings. The tube, which may be utilized as, for example, a support conduit, or conveyance hose, and which may be substantially larger in cross section than a conventional drinking straw, includes two end sections 12 and 14 of preferably circular cross section and any desired axial length and a hinge or toggle joint assembly 16 connected with and between the two end sections.

Figure 2:
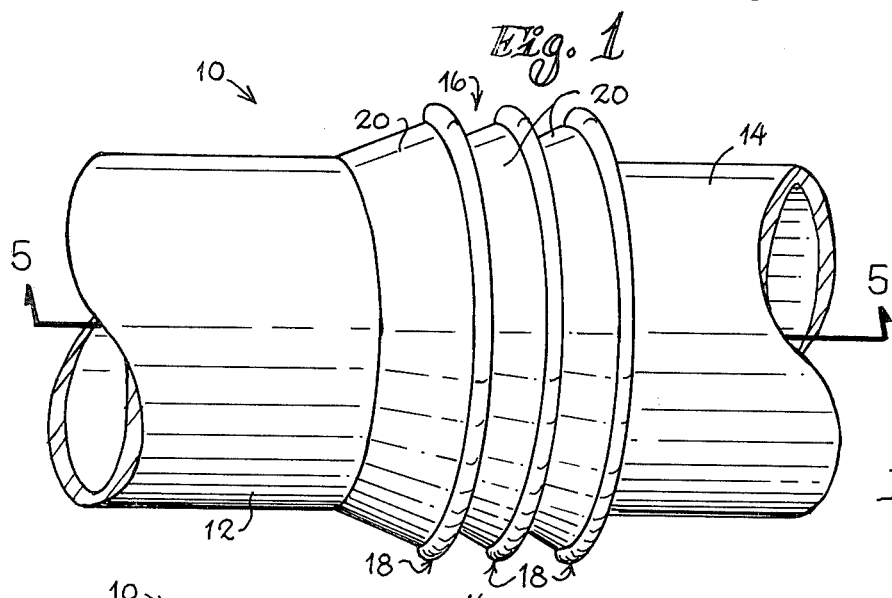
FIG. 2 is a perspective view of the tube portion of FIG. 1 with the toggle joint assembly illustrated in an axially contracted position.
Figure 3:
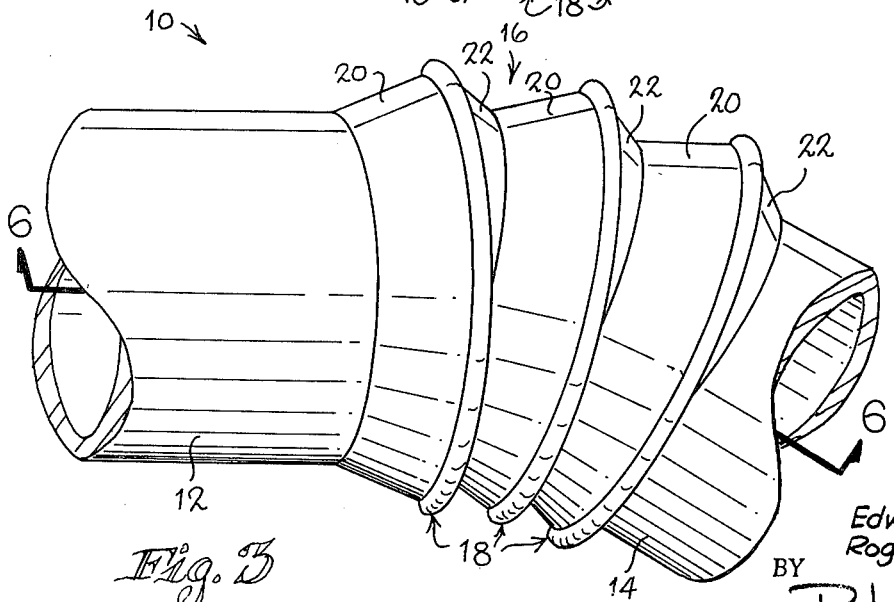
FIG. 3 is a perspective view of the tube portion of FIG. 1 with the toggle joint assembly illustrated in a bent position.

As will become more apparent hereinafter, toggle joint assembly 16 is provided for allowing axial extention of the tube 10 as illustrated in FIG. 1, axial contraction of the tube as illustrated in FIG. 2, and bending of the tube, as illustrated in FIG. 3. In all three cases, when a sufficient amount of force is applied to the tube in a given direction, the latter will move or toggle from a first fixed or stable position to a second fixed or stable position and remain in the latter position until a sufficient force is applied to the tube in a second or different direction. Thus, the tube may be axially expanded, axially contracted, or bent and will remain in these respective alternate stable positions for providing the desired contouring required for its particular intended use.

As illustrated best in FIGS. 1 and 4, toggle joint assembly 16, which is preferably made into an integral unit by a blow molding or other suitable process and which is preferably an integral part of tube 10, includes a plurality of identical sub-assemblies 18, each of which includes two uniformly inwardly tapering hollow sidewalls 20 and 22 of circular cross section, that is, hollow conical frustums, the sidewall 20 displaying an axial length slightly greater than the axial length of sidewall 22 when the sub-assembly 18 is in an axially extended position, as illustrated best in FIG. 4.

The sidewalls making up each sub-assembly 18 are positioned so that their larger circular ends are in confronting relationship with and spaced apart from one another when the sub-assembly is in its axially extended position. On the other hand, each of the shorter circular ends of each sub-assembly is in confronting relationship with, and flexibly connected to, an adjacent shorter circular end of an adjacent sub-assembly or, in the case of the end assemblies, the outermost shorter circular ends thereof are respectively connected with the end sections 12 and 14, as shown in FIG. 1. In this regard, it should be noted that the cross-sectional diameter of each sidewall at its respective shorter end is equal to the cross-sectional diameter of end sections 12 and 14. Accordingly, the toggle joint assembly 16 does not, in any substantial way, affect the cross-sectional area through which the material would flow through the tube.

In accordance with the present invention, each of the sub-assemblies 18 includes a hinge element in the form of, for example, ring-shaped hollow beaded portion or exteriorly extending protuberance 24 which is connected with and circumscribes the entire larger confronting ends of sidewalls 20 and 22 for allowing the shorter sidewall 22 to toggle between various alternate stable positions in a manner to be described hereinafter. With the sub-assembly 18 in its axially extended position, the beaded portion, as viewed in cross section in FIG. 4, is connected at one circumferential edge to the entire larger circular end of sidewall 20 and extends outwardly in a curvilinear path so as to define a partially circular path having a radius of curvature. The beaded portion terminates with its otherwise free circumferential edge circumferentially connected to the confronting and spaced-apart larger circular end of sidewall 22. As illustrated in FIG. 7, the beaded portion defines a circumferential channel which opens inwardly and in which the bead's cross-sectional center of curvature is located and portions 28 and 30, respectively, extending outwardly from the sidewalls 20 and 22 so as to define angles less than a straight angle therewith.

In operation, each sub-assembly 18 acts as an individual and independent toggle assembly which may be placed in a fixed, or stable, axially extended position (FIG. 4), axially contracted position (FIG. 5) or bent position (FIG. 6). Starting with the axially extended position of FIG. 4, it should be noted that the sidewalls extend or taper axially inwardly from bead 24 and away from each other so that, if extended at their larger ends, they would meet at an angle less than a straight angle. By applying an axially compressive force to the sub-assembly, the entire shorter sidewall 22 moves inwardly about its connection with beaded portion 24 toward the longer sidewall 20, as illustrated by the dotted lines in FIG. 7. Upon passing through a plane 32 which separates the circumferential channel 26 defined by beaded portion 24 into two circumferential sides lying on opposite sides of the beaded portion's cross-sectional center of curvature, the sidewall 22 toggles free of any externally applied force toward sidewall 20 where it comes to rest in a fixed or stable position substantially parallel therewith, as illustrated in FIGS. 5 and 7. In this respect, it should be noted that, when in its axially contracted position, the beaded portion 24 and specifically the channel 26 defined thereby maintains a curvilinear cross section having a radius of curvature.

It should be readily apparent that upon applying axial tension to sub-assembly 18 when the latter is in its contracted position, the sidewall 22 will move away from sidewall 20 and upon approaching plane 32 will independently toggle to the position shown in FIG. 4. In addition, by applying a sufficient bending force to the sub-assembly, that is, a force transverse to its elongated axis, only substantially half of the sidewall 22 will toggle between the aforedescribed contracted and extended position, as illustrated in FIG. 6. In this manner, the entire tube 10 can be bent and maintained in this bent position, as seen in FIG. 3.

It should be noted that the aforestated bending force can be applied at any desired point around the circumference of sub-assembly 18, so as to effect an appropriate bend in the sub-assembly. Thus, as illustrated in FIG. 3, if a downward bend is desired, a downward bending force would be applied to the tube. On the other hand, if, for example, a horizontal bend were desired, a corresponding horizontal bending force would be applied to the tube. In fact, if a sufficient number of sub-assemblies 18 are used, an S-shaped curve, a U-shaped curve, as well as various other curves required for the particular intended use of tube 10, may be effected by applying the appropriate forces thereto.

While the sub-assemblies 18 making up toggle joint assembly 16 may be constructed of any suitable material, they are preferably constructed of polypropylene because of its ability to hinge or flex without breaking. In addition, it is to be understood that the tube 10 illustrated in the various figures is not drawn to scale and therefore does not necessarily represent the actual working dimensions thereof. However, in view of the foregoing, once the desired diameter of the tube is selected, it would be well within the skill of the art to determine the dimensions of the toggle joint assembly so that the latter operates in the aforedescribed manner.

Although a single embodiment of the present invention has been illustrated and described, it is anticipated that various changes and modifications will be apparent to those skilled in the art, and such changes may be made without departing from the scope of the invention as defined by the following claims.

What is claimed is:

1. A tubular hinge assembly having relatively thick walls for inclusion between two ends of a relatively thick-walled conduit so as to permit the ends of the conduit to be moved with respect to one another between a plurality of stable positions, said hinge assembly comprising:

- a first hollow frusto-conical wall section having a major diameter at one end, a minor diameter at its other end; a first wall length dimension, and a wall thickness in excess of about 0.008 inch;
- a second hollow frusto-conical wall section having a major diameter at one end, a minor diameter at its other end, a second wall length dimension, and a wall thickness in excess of about 0.008 inch;
- said major diameters being substantially equal;
- said minor diameters being substantially equal;
- said first wall length dimension being greater than said second wall length dimension;
- an annular, hollow, beaded hinge element disposed between and circumferentially connecting said major diameters and defining a hollow, annular circumferential channel on the radially inner side of said hinge element;
- said hinge element having a curved, partially closed cross-sectional shape with a center of curvature located inwardly thereof; and
- at least one of said wall sections being movable about an imaginary annular axis substantially within the hollow annular structure of said hinge element between at least two alternate stable positions; said annular, hollow, beaded hinge element thereby facilitating the positioning of the conduit ends with respect to each other between a plurality of stable positions by defining and providing said annular axis and, at the same time, providing space in the hollow portion thereof for receiving at least part of the thickness of the movable wall section when in at least one of its stable positions.

2. A tubular hinge assembly as in claim 1 wherein the hollow portion of the annular, hollow, beaded hinge element is sufficiently large to permit at least portions of said first and second wall sections to extend substantially parallel with respect to each other in one of said stable positions.

3. A tubular hinge assembly as in claim 1 wherein said first and second wall sections and said annular, hollow, beaded hinge element are integral with said conduit to form a single continuous structure.

4. A tubular hinge assembly as in claim 1 wherein said at least one movable wall section consists of said second wall section.

5. A tubular hinge assembly as in claim 1 constructed from polypropylene.

6. A tubular hinge assembly as in claim 1 comprising a plurality of units comprising said first and second walls and connecting hinge elements, said plurality of units being serially connected at said minor diameters.

* * * * *